(No Model.)

G. TAYLOR.
PIPE SUPPORT.

No. 492,593. Patented Feb. 28, 1893.

Witnesses:
J. Staib
Chas. H. Smith

Inventor:
George Taylor
per Lemuel W. Serrell
Atty.

UNITED STATES PATENT OFFICE.

GEORGE TAYLOR, OF JERSEY CITY, NEW JERSEY.

PIPE-SUPPORT.

SPECIFICATION forming part of Letters Patent No. 492,593, dated February 28, 1893.

Application filed October 7, 1892. Serial No. 448,127. (No model.)

*To all whom it may concern:*

Be it known that I, GEORGE TAYLOR, a citizen of the United States, residing at Jersey City, in the county of Hudson and State of New Jersey, have invented a new and useful Improvement in Pipe-Supports, of which the following is a specification.

Modern or sanitary plumbing requires that all pipes and fixtures shall be exposed. In this form of plumbing the pipes are supported by devices that are attached to and project from the floors, side walls or ceilings. These devices are made of various lengths, but are not adjustable or interchangeable.

My improvement relates to a support for pipes in sanitary plumbing, the parts of which are adjustable and interchangeable.

In carrying out my invention I employ a two-part ring clip with lugs for connecting screws. This ring clip surrounds the pipe and grips the same, and said ring clip is made with a stud perforated for an attaching screw. I employ a back plate which if preferred may be secured in place by screws, and between the back plate and the stud on the ring clip I employ a ferrule of any desired length, or in lieu thereof a ferrule made of a series of rings, the interchangeable and adjustable feature being in the ferrules of the desired length or variable by adding to or lessening the number of rings. With the back plate, ferrule and attaching screw I use in some places a bracket instead of the ring clip.

Figure 2:
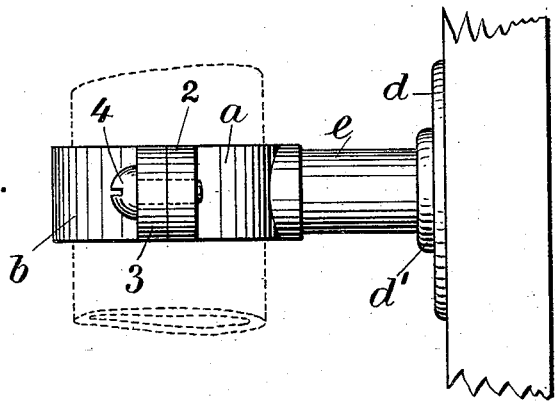
Figure 1:
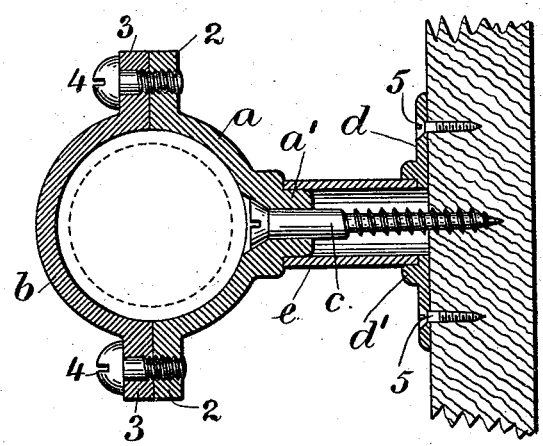
Figure 3:
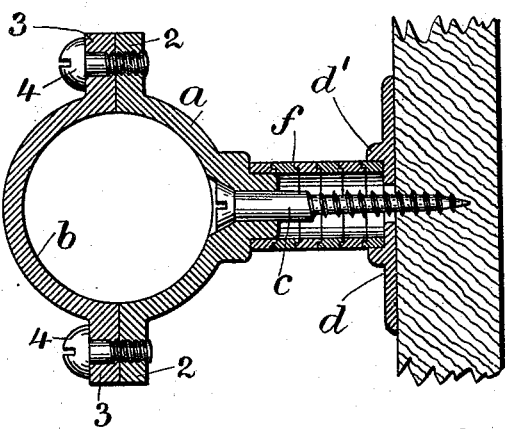

In the drawings, Figure 1 is a section of my improved device. Fig. 2 is an edge view. Fig. 3 is a section showing the ferrule made of a series of rings, and Fig. 4 a modification.

The two-part ring clip is represented at $a\, b$, the part $a$ being made with a stud $a'$ that is perforated for the attaching screw $c$ which passes through the same and the head of which is countersunk. The portion $a$ of the ring clip is made with lugs 2, and the portion $b$ with lugs 3, which come together and are connected by screws 4. The ring clip surrounds the pipe and grips the same through the pressure applied by the screws 4 in bringing the lugs 2, 3 together or nearly so.

$d$ represents the back plate of any desired size or ornamental conformation, and I may make this plate with holes for attaching screws 5. The center of this plate is perforated for the passage of the screw $c$ and is made with a rib $d'$.

$e$ represents the ferrule, or tubular section; this is between the back plate $d$ and the stud $a'$ and the attaching screw $c$ passes through the same and through the plate $d$ into the partition or floor to which the pipe is to be secured; and it will be noticed that the base of the ferrule next to the ring clip $a$ passes over the stud $a'$ and the end of the ferrule next the plate $d$ passes into a socket within the rib $d'$. These ferrules are to be provided of different lengths so as to accommodate the distance of the pipe from the floor, wall or ceiling. In case any ferrule should not be of exactly the right length, the end received within the rib $d'$ can be sawed off, and when brought to place the ragged edge of the thimble is concealed within the rib.

The equivalent of the ferrule $e$ is shown in Fig. 3 and consists of a series of rings $f$ or tubular sections which by preference are adapted to fit together. The length of the ferrule made thereby can be shortened by taking from the number of rings, or lengthened by adding to the same, so that within the limits of the width of the ring, any desired longitudinal adjustability of the ferrule may be obtained.

Figure 4:
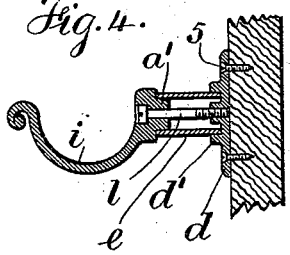

With the back plate $d$ and ferrule $e$ and attaching screw $c$ I sometimes use a bracket $i$ as shown in Fig. 4 instead of the ring clip. This is useful with pipes passing along a wall. In some instances where screws 5 are employed to secure the back plate to the wall, I prefer to use a tap bolt $l$ whose screw end is received in a central threaded hub on the back plate, the tap bolt $l$ taking the place of the screw $c$.

I claim as my invention—

1. The combination with the two part ring clip adapted to surround and grip a pipe and an attaching screw, of a back plate and a ferrule between the back plate and the ring clip, the screw passing through the ferrule and plate, substantially as set forth.

2. The combination with the two part ring clip and a perforated stud $a'$ on one part of the clip, of an attaching screw passing through the stud $a'$, a back plate $d$ adapted to be secured in place and having a rib $d'$, a ferrule $e$ adapted to be received over the stud $a'$ and within the rib $d'$ and through which the attaching screw passes, substantially as set forth.

3. The combination with the two part ring clip $a\,b$ and the perforated stud $a'$ on one part thereof, of a back plate $d$ adapted to be secured in place and provided with a rib $d'$, the attaching screw $c$, a ferrule $f$ composed of a series of rings setting against each other, fitting over the stud $a'$ and received against the rib $d'$ and through which the attaching screw $c$ passes, substantially as set forth.

4. The combination with the back plate, the ferrule and an attaching screw, of a support for a pipe having a stud $a'$ and through which the attaching screw passes in securing the parts, substantially as set forth.

Signed by me this 3d day of October, 1892.

GEORGE TAYLOR.

Witnesses:
 GEO. T. PINCKNEY,
 WILLIAM G. MOTT.